Nov. 26, 1957 W. LEE 2,814,218
WORK HOLDING CLAMP AND DRILL JIG
Filed June 16, 1954 2 Sheets-Sheet 1

INVENTOR.
WALTER LEE
BY Howard J. Whelan
ATTORNEY

Nov. 26, 1957 W. LEE 2,814,218
WORK HOLDING CLAMP AND DRILL JIG
Filed June 16, 1954 2 Sheets-Sheet 2
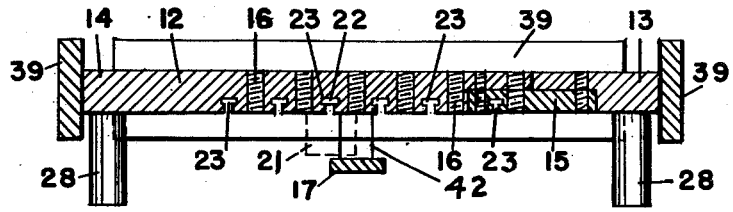
FIG.4
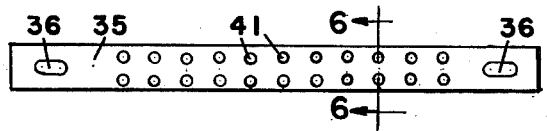 
FIG.5  FIG.6
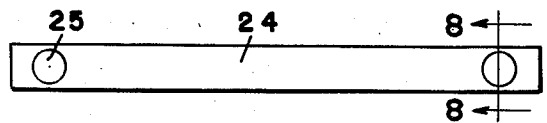 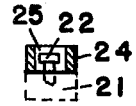
FIG.7  FIG.8
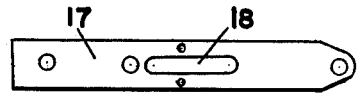
FIG.9
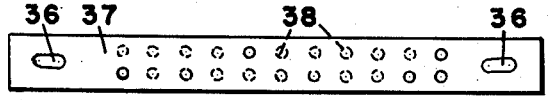
FIG.10
*INVENTOR.*
WALTER LEE
BY Howard J. Whelan.
ATTORNEY

United States Patent Office 2,814,218
Patented Nov. 26, 1957

2,814,218

WORK HOLDING CLAMP AND DRILL JIG

Walter Lee, Towson, Md.

Application June 16, 1954, Serial No. 437,043

3 Claims. (Cl. 77—62)

This invention relates to a work holding clamp and drill jig and more particularly to a jig that can be adjusted for use in drilling a small number of pieces in an extremely accurate manner.

Today one of the major expense items in the manufacture of experimental parts in industry (radio, television, radar, aviation, etc.) is the cost of fabricating drill jigs. These jigs which very often are only used for drilling a small number of pieces must by their very nature be extremely accurate. After the parts have been drilled the jig can no longer be used for anything else and even a minor change in subsequent experiments necessitates the manufacture of a new expensive drill jig.

It is therefore an object of this invention to provide an adjustable jig for use in holding and drilling flat pieces, having means for changing the location of the holes, their diameters as well as the pins used for locating the work in relation to the holes to be drilled.

A further object of this invention is to provide a new and improved drill jig that can be set-up in less time than it now takes to check a drill jig before it is put into operation.

Other objects will become apparent as the invention is more fully set forth.

For a better understanding of the invention and its objects, reference is made to the accompanying drawings, which in conjunction with the following description outline a particular form of the invention by way of example, while the claims emphasize the scope thereof.

In the drawings:

Figure 4 is a sectional view taken along line 4—4 of Figure 1;

Figure 5 is a plan view of a drill plate having closely spaced holes;

Figure 6 is a sectional view taken along line 6—6 of Figure 5;

Figure 7 is a plan view of a support for the adjustable pins used in locating the flat plates to be drilled;

Figure 8 is a sectional view taken along line 8—8 of Figure 7;

Figure 9 is a plan view of a hold-down clamp used with this invention; and

Figure 10 is a drill plate cover.

Similar reference numerals refer to similar parts throughout the drawings.

Figure 1:
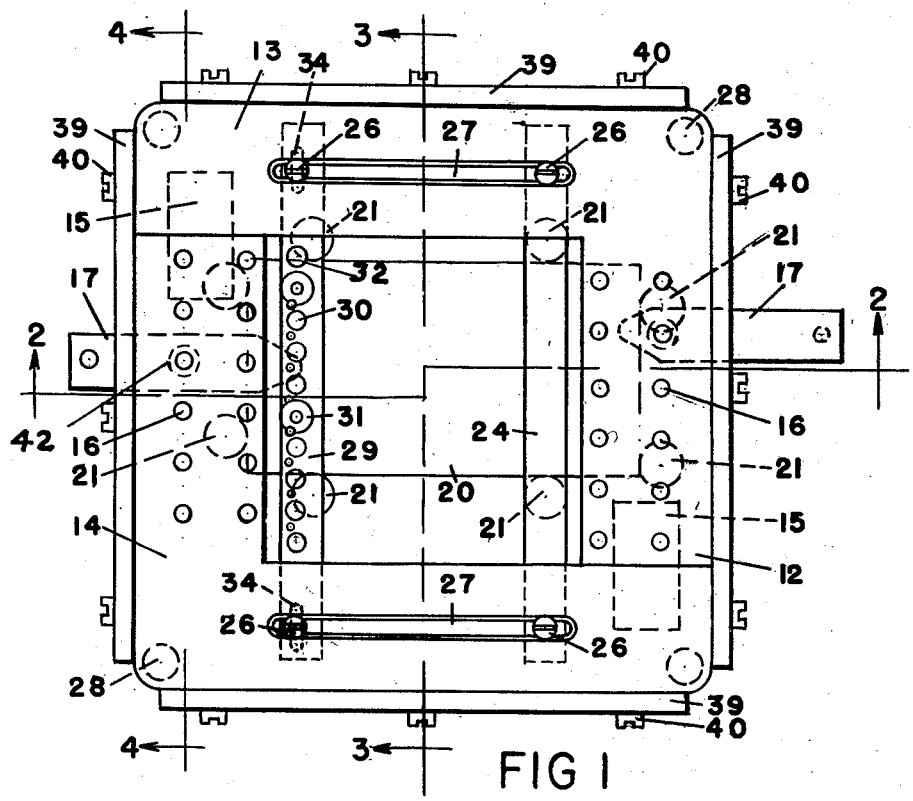
Figure 1 is a plan view of the adjustable jig embodying this invention, set-up to drill a flat plate attached thereto.
Figure 2:
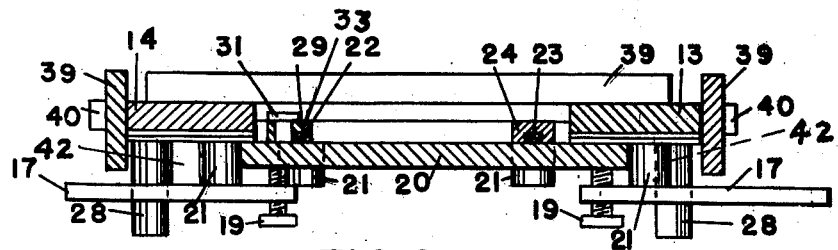
Figure 2 is a sectional view taken along line 2—2 of Figure 1.
Figure 3:
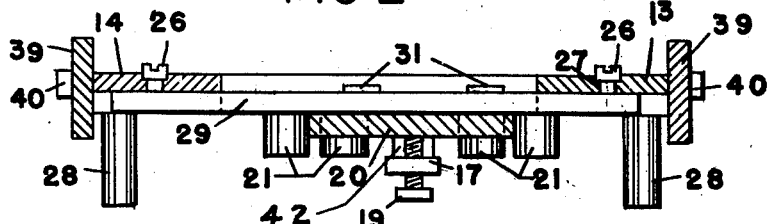
Figure 3 is a sectional view taken along line 3—3 of Figure 1.

In the construction shown in the drawings a base plate 12 is preferably formed by joining sections 13 and 14 together with connecting links 15. Each section is provided with a series of tapped holes 16 conveniently spaced to permit maximum range of adjustment for the hold-down clamps 17. The hold-down clamps 17 are provided each with an elongated slot 18 to facilitate proper adjustment, so its screw 19 can be tightened against the flat plate 20 to be drilled in the jig, and each clamp 17 is spaced from base plate 12 by heel bearing 42. Stop pins 21 are attached by T head studs 22 to the T slots 23 in the sections 13 and 14 and in the same manner stop pins 21 are also attached to the stop pin plate 24. The stop pin plate 24 is provided with holes 25 to receive bolts 26 that slide in elongated slots 27 in the sections 13 and 14. Legs 28 are attached to the base sections 13 and 14, and a drill plate 29 is provided with holes 30 to receive drill bushings 31 anchored to the plate 29 by bushing holding screws 32 in the conventional manner. The drill plate 29 is adjustably attached to the elongated slots 27 in the sections 13 and 14 by screws or bolts 26. This permits the drill plate to be turned around 180 degrees to enable the holes to be drilled close to the side of the base 12. The drill plate 29 also has a T slot 33 for stop pins 21 held thereto by T head studs 22. Elongated slots 34 in drill plate 29 provide additional adjustment for the drill plate 29 on the base 12. Many times in the use of the jig it is found necessary to drill holes closely together, and to meet this condition, a drill plate 35 (see Fig. 5) is provided with holes 41 and elongated slots 36 provide additional adjustment on bolts 26. To prevent confusion in the use of drill plate 35 a cover 37 is provided to fit over the drill plate 35 and only those holes 38 which are to be drilled are visible. These covers can be easily stamped out and have holes embossed thereon to permit quick punching out of those holes to be used. Side rails 39 are affixed by bolts 40 to the base plate 12. In the use of the universal holding clamp and adjustable drill jig the stop pins are located as required and this makes it possible that each piece to be drilled will be located in the same position each time, the locations are then checked for accuracy by any of the known methods. Next suitable drill plates with the desired bushings are assembled in the jig and located in relation to the stop pins, the appropriate hold-down clamps are selected, depending on the size of the piece to be drilled. The flat plate to be drilled is located in the jig against the stop pins 21 and held by screws 19 in the hold-down clamps 17.

While but one general form of the invention is shown in the drawings and described in the specification, it is not desired to limit this application for patent to this particular form as it is appreciated that other forms of construction could be made that would use the same principles and come within the scope of the appended claims.

Having thus described the invention, what is claimed is:

1. A work holding clamp and drill jig device comprising a pair of similar, L-shaped sections, link means connecting said sections together to form a plate-like structure having an opening in the center thereof, grooved retaining means formed in the bottom side of each of said sections, stop pins slidably suspended from said sections by said grooved retaining means, a stop plate extending across said opening and having its opposite ends slidably secured to said sections, stop pins shiftable along and projecting downwardly from said stop plate to hold an object to be drilled against lateral shifting with respect to the sides of said opening, a pair of clamp structures each adjustably secured to the bottom portion of one of said sections and having means for engaging the object to be drilled to support the same, a drill plate extending across said opening and having each of its opposite ends removably and slidably secured to one of said sections, said drill plate being provided with a set of holes extending therethrough and spaced apart according to a predetermined plan and each of said holes having a drill bushing removably positioned therein.

2. A device of the type set forth in claim 1, in which said drill plate is provided with stop pins shiftably suspended therefrom for engagement with edge portions of the object to be drilled.

3. A device of the type set forth in claim 1, in which each of the sections is provided with legs to space the sections from a support, which may be carrying the device.

References Cited in the file of this patent

UNITED STATES PATENTS

| | | |
|---|---|---|
| 1,954,708 | Mass | Apr. 10, 1934 |
| 2,050,709 | Lopez | Aug. 11, 1936 |
| 2,591,814 | Hill | Apr. 8, 1952 |
| 2,651,951 | Altenburger | Sept. 15, 1953 |

FOREIGN PATENTS

| | | |
|---|---|---|
| 124,989 | Great Britain | Apr. 10, 1919 |